(12) United States Patent
Flotats et al.

(10) Patent No.: US 7,111,918 B2
(45) Date of Patent: Sep. 26, 2006

(54) DUAL-AXIS MEDIA-POSITIONING SENSOR

(75) Inventors: Carles Flotats, Barcelona (ES); David Claramunt, Sant Esteve Sasrovires (ES); Jose M. Rio Doval, Sant Cugat del Valles (ES); Rodrigo Ruiz, Terrassa (ES); Francesc Subirada, Castellbisbal (ES); Joaquim Veciana, Barcelona (ES); Marc Jansa, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 50 days.

(21) Appl. No.: 10/766,554

(22) Filed: Aug. 13, 2004

(65) Prior Publication Data

US 2006/0033769 A1 Feb. 16, 2006

(51) Int. Cl.
  *B41J 29/393* (2006.01)
  *B41J 29/38* (2006.01)
(52) U.S. Cl. .......................................... 347/19; 347/16

(58) Field of Classification Search .................. 347/19
See application file for complete search history.

(56) References Cited

U.S. PATENT DOCUMENTS

| 6,527,360 B1 * | 3/2003 | Otsuki et al. ................. 347/19 |
| 2004/0108474 A1 * | 6/2004 | Kato ....................... 250/559.4 |
| 2004/0119769 A1 * | 6/2004 | Campbell et al. ............. 347/19 |

\* cited by examiner

*Primary Examiner*—Vip Patel
*Assistant Examiner*—Jannelle M. Lebron

(57) ABSTRACT

A media-positioning sensor assembly in one embodiment of the invention is disclosed that includes a mechanism and a media-positioning sensor. The mechanism moves back and forth over media along a first axis. The media advances past the mechanism along a second axis perpendicular to the first axis. The media-positioning sensor is situated on the mechanism and is to detect positioning of the media relative to the mechanism along at least one of the first axis and the second axis.

28 Claims, 9 Drawing Sheets

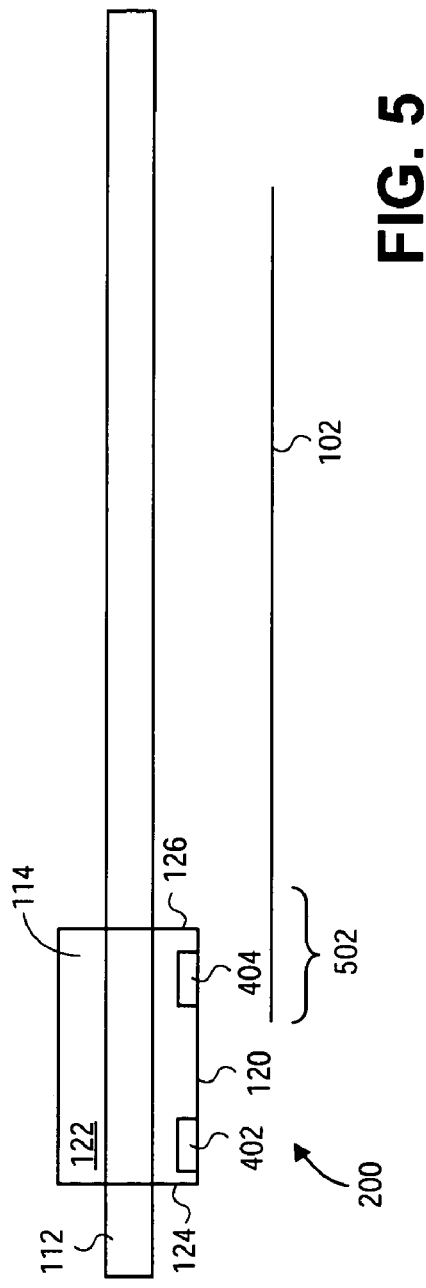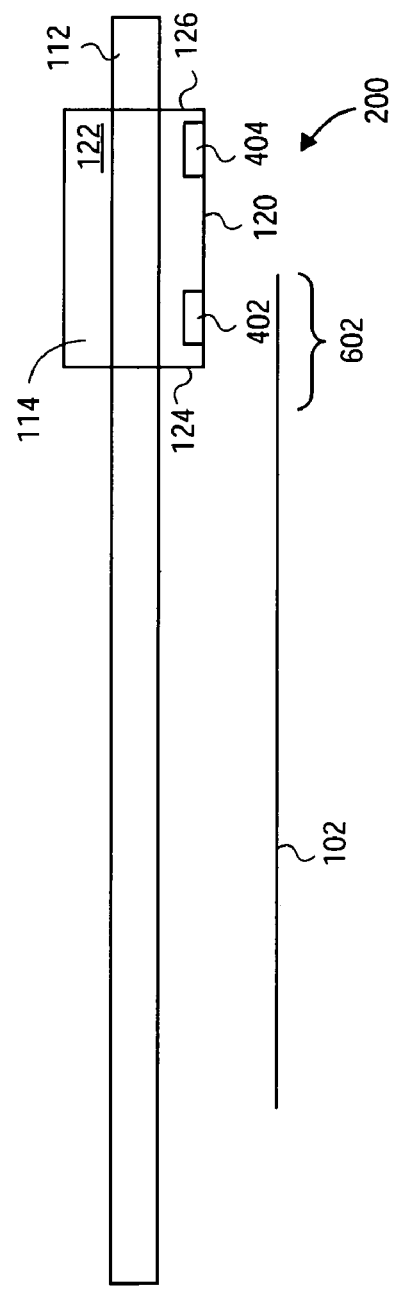

DUAL-AXIS MEDIA-POSITIONING SENSOR

BACKGROUND

Image-forming devices are frequently used to form images on media, such as paper and other types of media. Image-forming devices include laser printers, inkjet printers, and other types of printers and other types of image-forming devices. Media is commonly moved through an image-forming device as the device forms the image on the media. The image-forming mechanism of the device, such as an inkjet-printing mechanism, may move in a direction perpendicular to that in which the media moves through the image-forming device. Alternatively, the image-forming mechanism may remain in place while the media moves past it.

For high-quality image formation, the movement of the media through an image-forming device is desirably precisely controlled. If the media moves more than intended, there may be gaps in the resulting image formed on the media, whereas if the media moves less than intended, there may be areas of overlap in the resulting image. A media-advance sensor can be used to measure media advancement. However, high-quality media-advance sensors can be expensive, rendering their inclusion in lower-cost and mid-cost image-forming devices prohibitive. Less accurate and less costly sensors may be used, but they may provide less than desired sensing capabilities.

SUMMARY OF THE INVENTION

A media-positioning sensor assembly in one embodiment of the invention includes a mechanism and a media-positioning sensor. The mechanism moves back and forth over media along a first axis. The media advances past the mechanism along a second axis perpendicular to the first axis. The media-positioning sensor is situated on the mechanism and is to detect positioning of the media relative to the mechanism along at least one of the first axis and the second axis.

BRIEF DESCRIPTION OF THE DRAWINGS

The drawings referenced herein form a part of the specification. Features shown in the drawing are meant as illustrative of only some embodiments of the invention, and not of all embodiments of the invention, unless explicitly indicated, and implications to the contrary are otherwise not to be made.

FIG. 5 is a diagram depicting how the media-positioning sensor assembly of FIG. 4 operates when positioned at one side of media, according to an embodiment of the invention.

FIG. 6 is a diagram depicting how the media-positioning sensor assembly of FIG. 4 operates when positioned at the other side of the media, according to an embodiment of the invention.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Media-positioning Sensor Assembly

Figure 1:
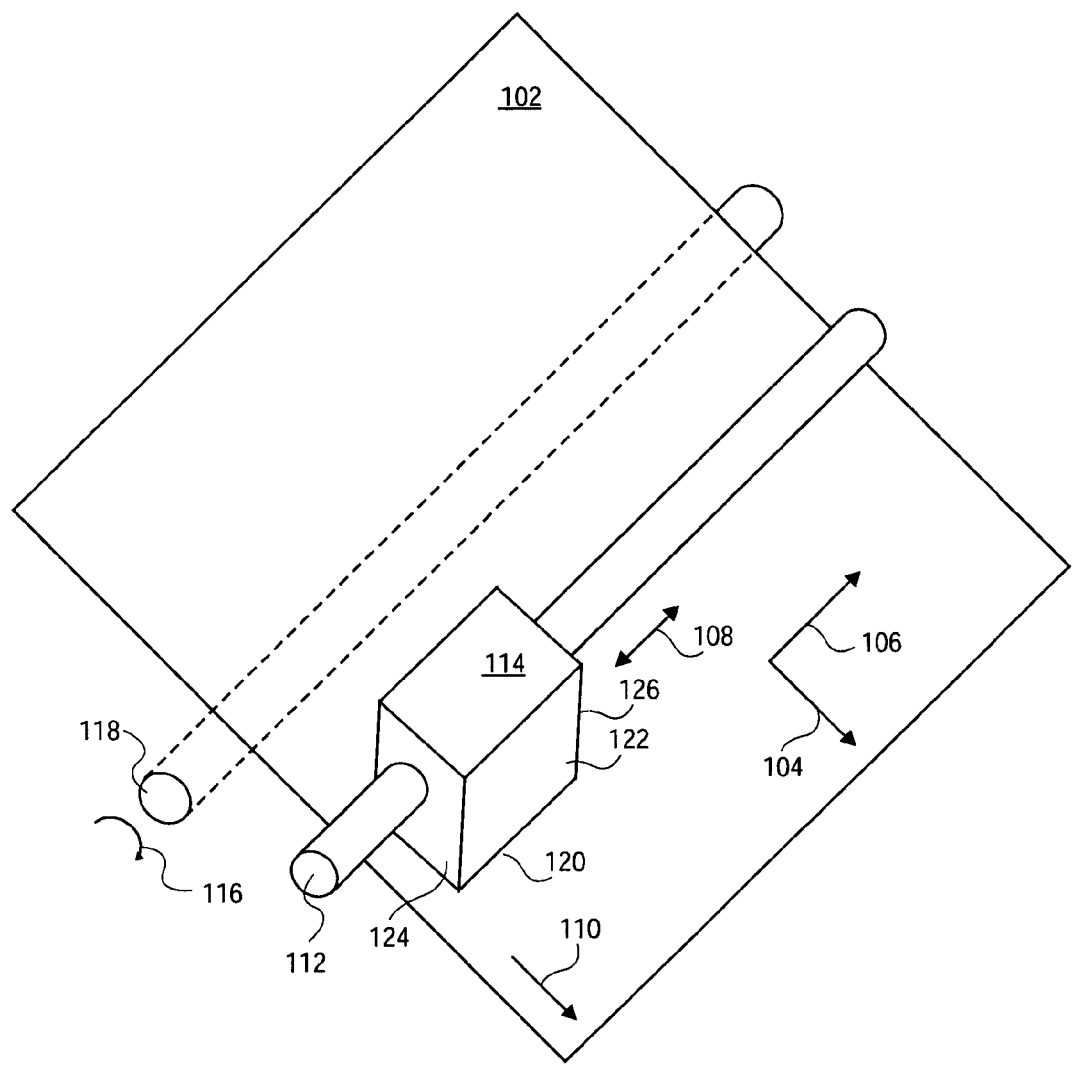
FIG. 1 is a diagram of a perspective view of a media-positioning sensor assembly, according to an embodiment of the invention.

FIG. 1 shows a perspective view of a media-positioning sensor assembly, according to an embodiment of the invention. The sensor assembly specifically includes a shaft 112 on which a mechanism 114 is slidably situated. The mechanism 114 has a left side 124, a right side 126, a front 122, and a bottom 120. The mechanism 114 is able to move back and forth along a scanning axis 106, as indicated by the bidirectional arrow 108. Media 102 is advanced by a roller 118 rotating in the direction indicated by the arrow 116, causing the media 102 to move along a media axis 104 that is perpendicular to the scanning axis 106, as indicated by the arrow 110.

Figure 2:
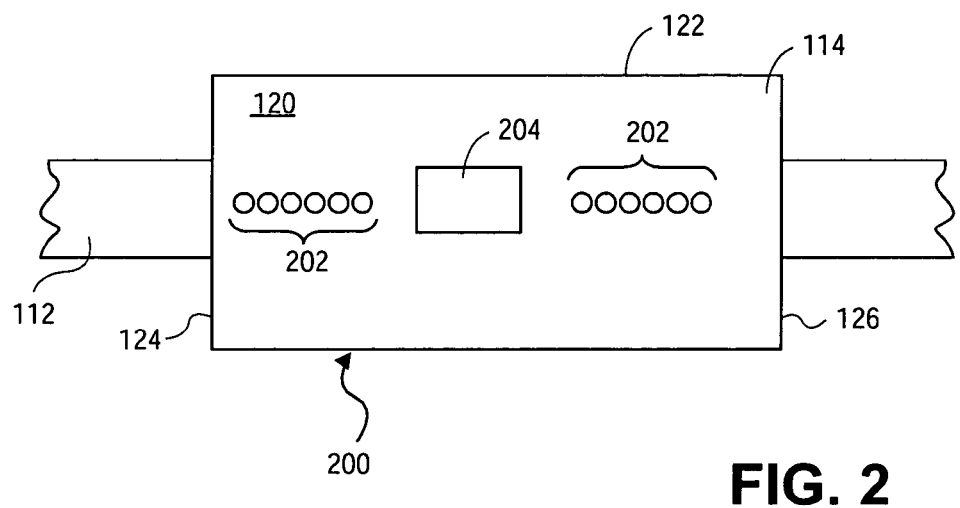
FIG. 2 is a diagram of a bottom view of the media-positioning sensor assembly of FIG. 1, according to an embodiment of the invention.

FIG. 2 shows a bottom view of the media-positioning sensor assembly of FIG. 1, according to an embodiment of the invention. The sensor assembly is identified as the sensor assembly 200, which includes the shaft 112 and the mechanism 114 slidably situated on the shaft 112. The mechanism 114 is depicted in FIG. 2 as a fluid-ejection mechanism, such as an inkjet-printing mechanism, that has a number of fluid-ejection devices 202, which can be inkjet pens capable of ejecting ink. A media-positioning sensor 204 is situated in the middle of the fluid-ejection devices 202. Since the sensor 204 is situated on the bottom 120 of the mechanism 114, it is directed against the media 102 in FIG. 1. The sensor 204 may be an optical sensor, such as a charge-coupled device (CCD) sensor, a complementary metal-oxide semiconductor (CMOS) sensor, or another type of optical sensor.

The media-positioning sensor 204 is able to detect positioning of the media 102 along both the media axis 104 and the scanning axis 106. When the mechanism 114 on which the sensor 204 is mounted moves back and forth along the scanning axis 106, the sensor 204 is able to detect positioning of the media 102 relative to the mechanism 114 along the scanning axis 106. When the media 102 is advanced by the roller 118 along the media axis 104, the sensor 204 is likewise able to detect positioning of the media 102 relative to the mechanism 114 along the media axis 104. Thus, a single sensor is employed to detect positioning of the media 102 along both the axes 104 and 106. This represents a cost savings on the part of embodiments of the invention, since a different sensor for each of the axes 104 and 106 is not needed. Since only one sensor may be needed, the sensor may be able to be a higher-quality sensor and still satisfy cost constraints, whereas two such sensors may have exceeded these constraints.

Figure 3:
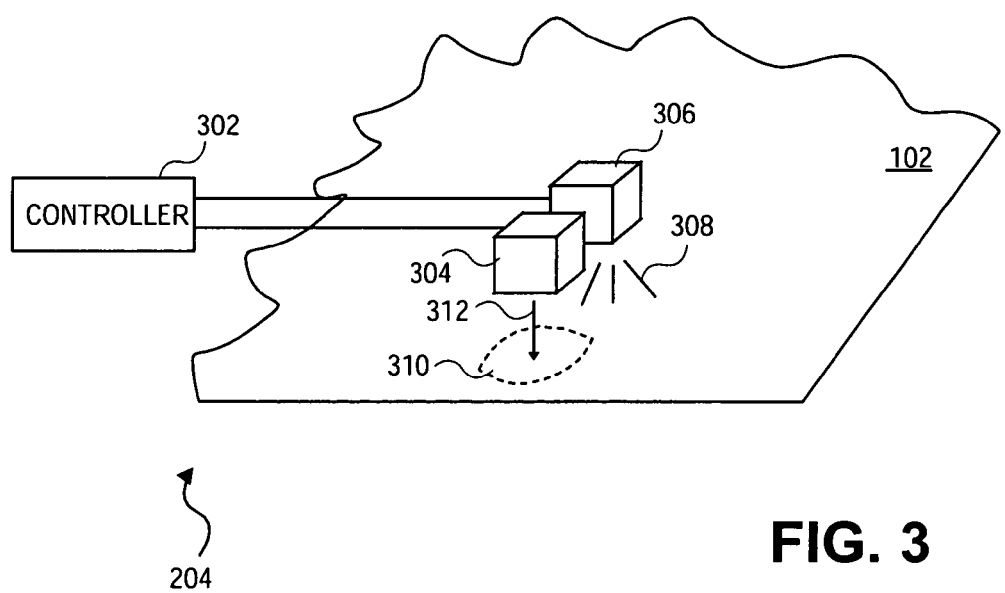
FIG. 3 is a diagram of a perspective view of a media-positioning sensor, according to an embodiment of the invention.

FIG. 3 shows the media-positioning sensor 204 in more detail, according to an embodiment of the invention. The sensor 204 includes an optical sensing mechanism 304, an illumination mechanism 306, such as a light-emitting diode (LED), and a controller 302. The optical sensing mechanism 304 captures an image of a portion 310 of the media 102 that lies under the mechanism 304, as indicated by the arrow 312. The illuminating mechanism 306 illuminates the portion 310 of the media 102 so that the mechanism 304 is able to capture an image, as indicated by the rays 308. The controller 302, which is more generally a controlling mechanism, may be software, hardware, or a combination of software and hardware. The controller 302 controls the mechanism 304 and 306 so that images are captured and media portions are illuminated at desired times. The images captured may be of inherent physical aspects of the media 102, which are utilized to determine the positioning of the media 102.

Alternate Embodiment of Media-positioning Sensor Assembly

In the embodiment of the invention that has been described in relation to FIG. 2, the media-positioning sensor 204 is situated within the fluid-ejection devices 202, in the middle between the left side 124 and the right side 126 of the mechanism 114. This embodiment of the invention is generally appropriate where the sensor 204 remains over the media 102 in FIG. 1 regardless of where the mechanism 114 has slidably moved on the shaft 112. That is, even when the mechanism 114 is at either far end of the shaft 112, the sensor 204 remains over the media 102.

Figure 4:
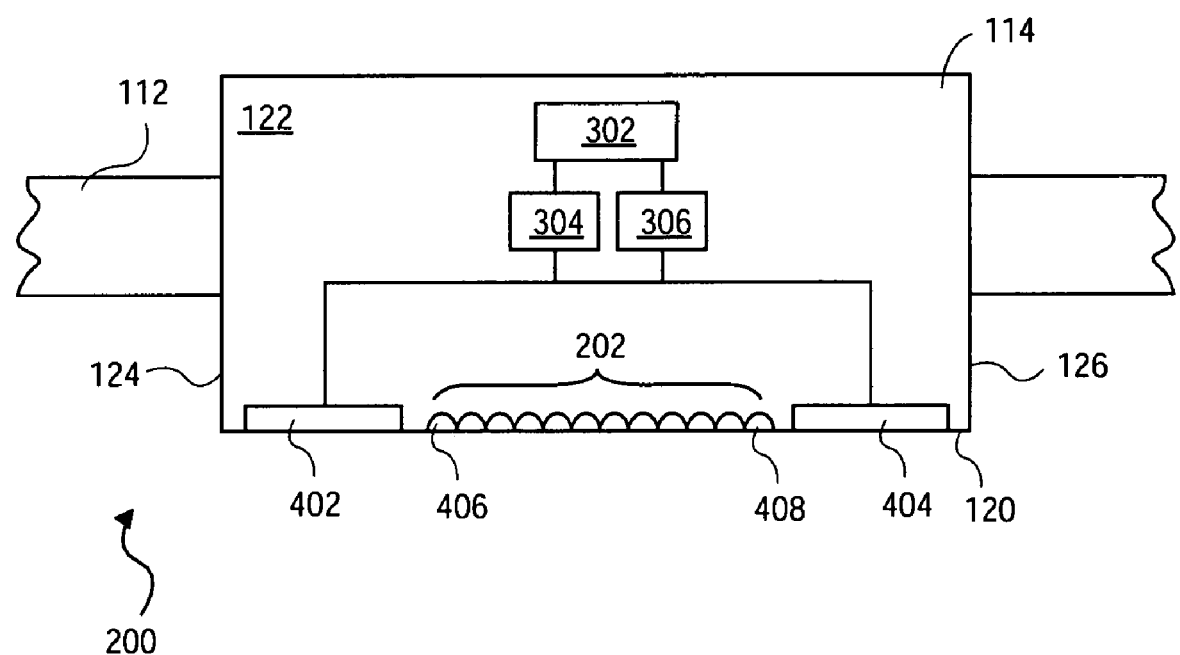
FIG. 4 is a diagram of a side view of a media-positioning sensor assembly, according to another embodiment of the invention.

FIG. 4 shows a side view of the media-positioning sensor assembly 200 according to another embodiment of the invention. The assembly 200 includes optical sub-sensors 402 and 404, towards the left side 124 and the right side 126, respectively, of the mechanism 114. Thus, the sub-sensors 402 and 404 are at either end of the fluid-ejection devices 202. The sub-sensor 402 is specifically between a first fluid-ejection device 406 and the left side 124 of the mechanism 114, whereas the sub-sensor 404 is specifically between a last fluid-ejection device 408 and the right side 126 of the mechanism 114. The front 122 and the bottom 120 of the mechanism 114 are also identified in FIG. 4, as is the shaft 112 on which the mechanism 114 is slidably situated.

The controller 302 is able to direct the light output by the illumination mechanism 306 to either the sub-sensor 402, the sub-sensor 404, or both. Similarly, the image captured by the optical sensing mechanism 304 may be of the media portion(s) underneath the sub-sensor 402, the sub-sensor 404, or both. The selection of which media portion(s) are captured as images is determined by which sub-sensors 402 and 404 are illuminated. Having the two sub-sensors 402 and 404 at the sides 124 and 126 of the mechanism 114, rather than duplicating the entirety of the media-positioning sensor assembly 200 or the sensing mechanism 304 and/or the illumination mechanism 306 at both the sides 124 and 126, is more economical from a cost standpoint.

FIGS. 5 and 6 show side views of how the media-positioning sensor assembly 200 of FIG. 4 operates when the mechanism 114 is situated over the left side 502 and over the right side 602, respectively, of the media 102, according to an embodiment of the invention. In FIG. 5, the mechanism 114 has moved to the far left of the shaft 112 in a first end position. As a result, the sub-sensor 402 is not directed over the media 102, whereas the sub-sensor 404 is directed over the media 102, specifically over the left side 502 of the media 102. Therefore, the controller 302 of FIG. 4 directs the illumination mechanism 306 of FIG. 4 to illuminate only the media portion underneath the sub-sensor 404, so that the mechanism 304 of FIG. 4 captures an image of this media portion.

In FIG. 6, the mechanism 114 has moved to the far right of the shaft 112 in a second end position. As a result, the sub-sensor 402 is directed over the media 102, specifically over the right side 602 of the media 102, whereas the sub-sensor 404 is not directed over the media 102. Therefore, the controller 302 of FIG. 4 directs the illumination mechanism 306 of FIG. 4 to illuminate only the media portion underneath the sub-sensor 402, so that the mechanism 304 of FIG. 4 captures an image of this media portion. The media-positioning sensor assembly 200 of FIG. 4 is preferably employed in lieu of the sensor assembly 200 of FIG. 2 where the sensor 204 of FIG. 2 would not be positioned over the media 102 either at the left side 502 of FIG. 5 of the media 102, or at the right side 602 of FIG. 6 of the media 102.

Image-forming Device and Method

Figure 7:
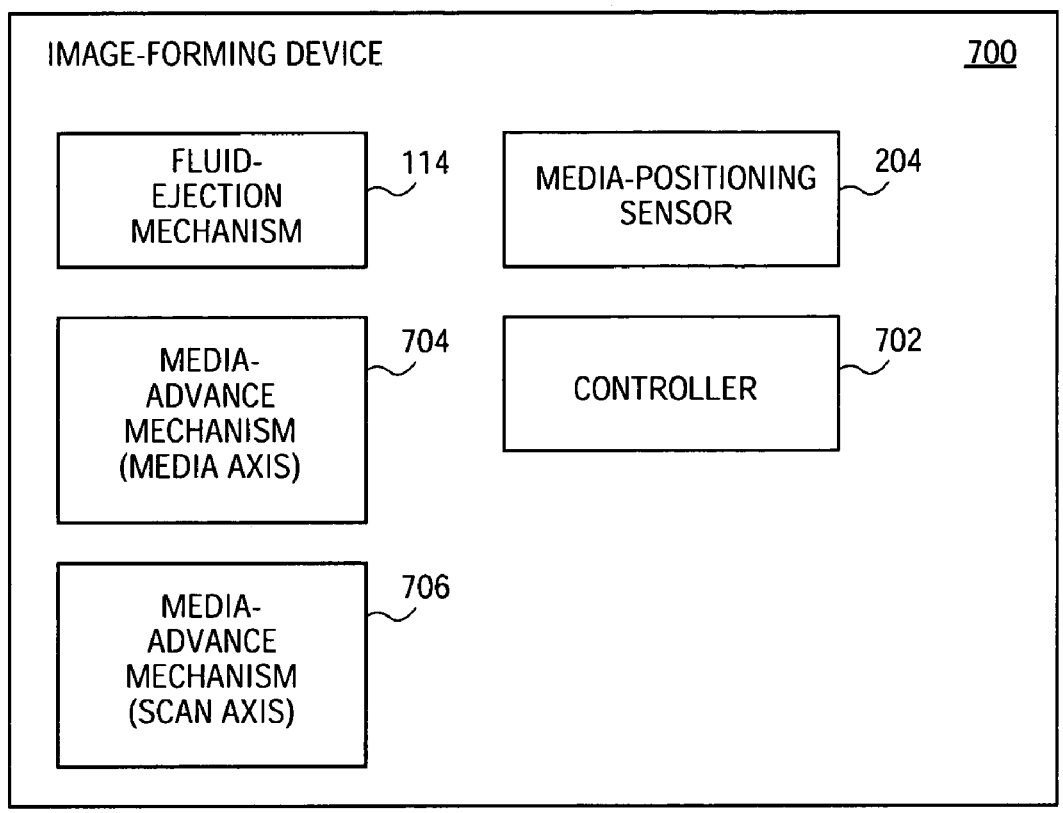
FIG. 7 is a block diagram of an image-forming device, according to an embodiment of the invention.

FIG. 7 shows a block diagram of an image-forming device 700, according to an embodiment of the invention. As can be appreciated by those of ordinary skill within the art, the image-forming device 700 may include components in addition to and/or in lieu of those depicted in FIG. 7. The image-forming device 700 may be a fluid-ejection device, such as an inkjet printer, or another type of image-forming device. The image-forming device 700 specifically is depicted in FIG. 7 as including a fluid-ejection mechanism 114, a media-advance mechanism 704, a media-advance mechanism 706, a media-positioning sensor 204, and a controller 702.

The fluid-ejection mechanism 114 moves back and forth over media along a first axis to eject fluid on the media, as has been described in relation to FIG. 1. The media-advance mechanism 704 advances the media along the media axis, which is a second axis perpendicular to the first axis. The mechanism 704 may include, for instance, the roller 118 of FIG. 1. The media-advance mechanism 706 advances the media along the scan axis, which is the first axis. The mechanism 706 may include, for instance, the shaft 112 of FIG. 1. The media-positioning sensor 204 moves in concert with the mechanism 114, and may be situated on the mechanism 114, as has been described in relation to FIG. 1. The sensor 204, which may be an optical sensor, detects positioning of the media relative to the mechanism 114 along both the first and the second axes. The controller 702 may be a combination of hardware and/or software, and controls the advancement of the media by the mechanism 704, as well as movement over the media by the mechanism 114, based on positioning of the media relative to the mechanism 114 as detected by the sensor 204.

Figure 8:
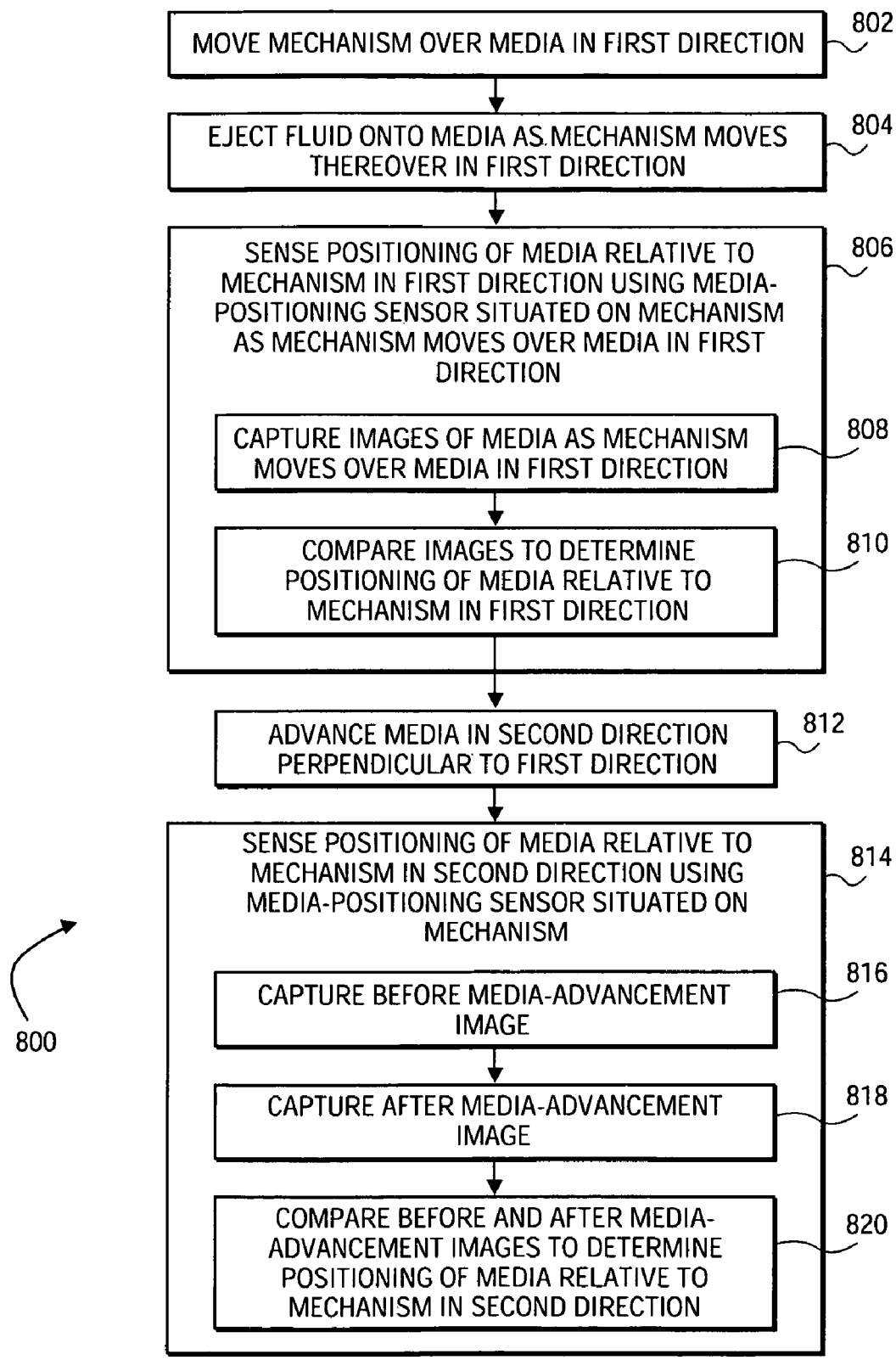
FIG. 8 is a flowchart of a method, according to an embodiment of the invention.

FIG. 8 shows a method 800, according to an embodiment of the invention. The method 800 may be performed by an image-forming device, such as the image-forming device 700 of FIG. 7. The method 800 may also be performed by a media-positioning sensor, such as the sensor 204 that has been described, and/or by a media-positioning sensor assembly, such as the sensor assembly 200 that has been described. A mechanism on which a media-positioning sensor is situated is moved in a first direction over media (802). Preferably, fluid is ejected by the mechanism, or by a fluid-ejection mechanism situated on the mechanism, as the mechanism moves over the media in the first direction (804).

Next, the positioning of the media relative to the mechanism is sensed in the first direction using the media-positioning sensor, as the media moves over the media in the first direction (806). This can include capturing images of the media by the sensor as the mechanism moves over the media in the first direction (808), and then comparing the images with one another to determine the positioning of the media relative to the mechanism in the first direction (810). For instance, the inherent physical aspects or characteristics of the media captured in one image may be compared with those captured in an immediately successive image to determine how far the mechanism has moved relative to the media in the first direction, as can be appreciated by those of ordinary skill within the art.

The media is advanced in a second direction perpendicular to the first direction (812), and the positioning of the media relative to the mechanism is sensed in the second direction using the same media-positioning sensor situated on the mechanism (814). This can include capturing an image of the media before the media has been advanced (816), and capturing an image of the media after the media has been advanced (818). The before and after images can then be compared to determine the positioning of the media relative to the mechanism in the second direction (820). For instance, as before, the inherent physical aspects of the media capture in the before image may be compared with those compared in the second image to determine how far the media has advanced relative to the media in the second direction, as can be appreciated by those of ordinary skill within the art.

Firing Signals

In one embodiment of the invention, a media-positioning sensor, such as the media-positioning sensor 204 of FIG. 7, is able to generate firing, or electrical, signals to a controller, such as the controller 702 of FIG. 7, at a predetermined resolution, based on motion of the media relative to the sensor as detected by the sensor. For instance, the resolution may be 100, 300, 600, 1200, 2400, or another number res of signals per inch. For every inch that the media moves relative to the sensor, the sensor thus generates the number res of signals. Therefore, the sensor generates a signal for every 1/res inches that the media moves relative to the sensor. For instance, these signals may be generated as part of sensing the positioning of the media in 806 and/or 814 of the method 800 of FIG. 8.

Figure 9:
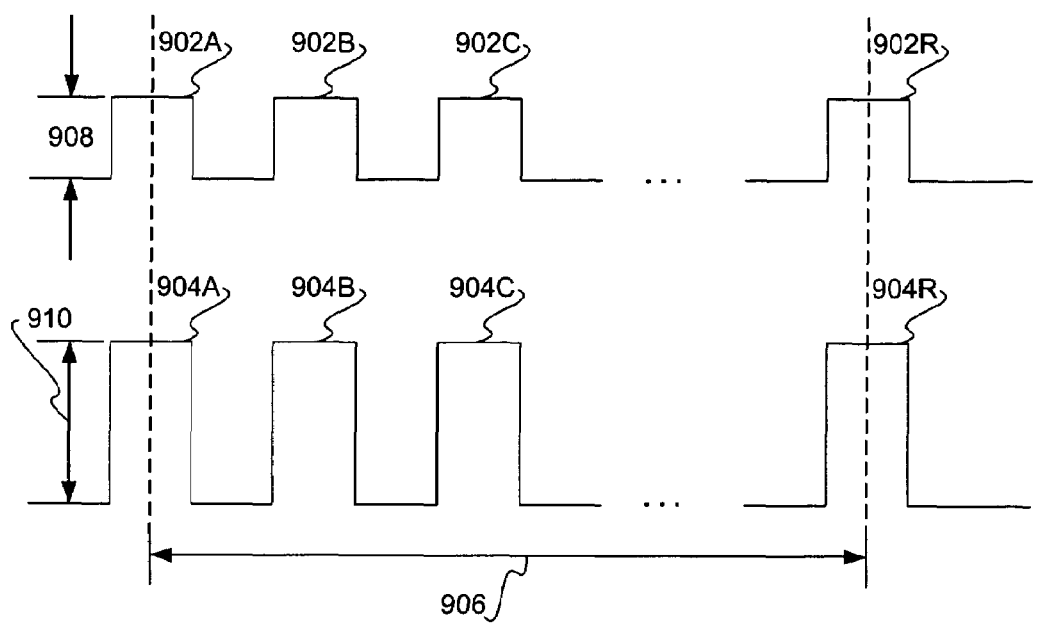
FIG. 9 is a diagram depicting two examples of electrical, or firing, signals that can be generated by a media-positioning sensor, according to an embodiment of the invention.

FIG. 9 shows two example series of electrical signals 902A, 902B, 902C, . . . , 902R and 904A, 904B, 904C, . . . , 904R that may be generated by a media-positioning sensor and received by a controller, according to an embodiment of the invention. There are R number of signals 902 and R number of signals 904, corresponding to the resolution of the media-positioning sensor. Thus, over a distance of one inch of relative media movement, as indicated by the distance 906, the sensor generates R of the signals 902 or R of the signals 904, depending on whether the movement has occurred in the direction of the advancement of the media, or perpendicular to the direction of the advancement of the media. The signals 902 have an amplitude, or height, 908, whereas the signals 904 have an amplitude, or height, 910.

For example, where relative media movement occurs perpendicular to the direction of the advancement of the media, as indicated by the axis 106 in FIG. 1, for each 1/R-inch movement of the mechanism 114 of FIG. 1 over the media, one of the signals 902, having the amplitude 908, is generated by the sensor. The direction of movement of the mechanism 114 either left or right over the media is known, and the actual distance that the mechanism 114 travels can be determined to a granularity of 1/R inches. In this way, positioning of the mechanism 114 along the axis 106 over the media is able to be determined.

As another example, where relative media movement occurs parallel to the direction of the advancement of the media, as indicated by the axis 104 in FIG. 1, for each 1/R-inch movement of the media relative to the mechanism 114 of FIG. 1, one of the signals 904, having the amplitude 910, is generated by the sensor. The direction of advancement of the media either forward or back relative to the mechanism 114 is known, and the actual distance that the media travels can be determined to a granularity of 1/R inches. In this way, positioning of the mechanism 114 along the axis 104 over the media can be determined.

The signals 902 and 904 have different amplitudes 908 and 910, respectively, so that the controller receiving the electrical, or firing, signals from the media-positioning sensor is able to determine along which axis the sensor has detected relative motion of the media. In the example of FIG. 9 that has been described, both the signals 902 and the signals 904 have the same resolution R. However, in another embodiment of the invention, the signals 902 and 904 may have different resolutions, as can be appreciated by those of ordinary skill within the art. The media-positioning sensor can replace a separate encoder that is typically used to generate firing signals.

Top-of-form Considerations

The media-positioning sensor of varying embodiments of the invention that has been described can be employed in one particular embodiment of the invention in relation to the top of form of the media. The top of form of the media is the top margin, or the beginning, of the media, that first passes under the media-positioning sensor. For instance, the top of form of the media is the top margin, or the beginning of the media, that first passes under the mechanism relative to the axis 104 in FIG. 1.

Figure 10:
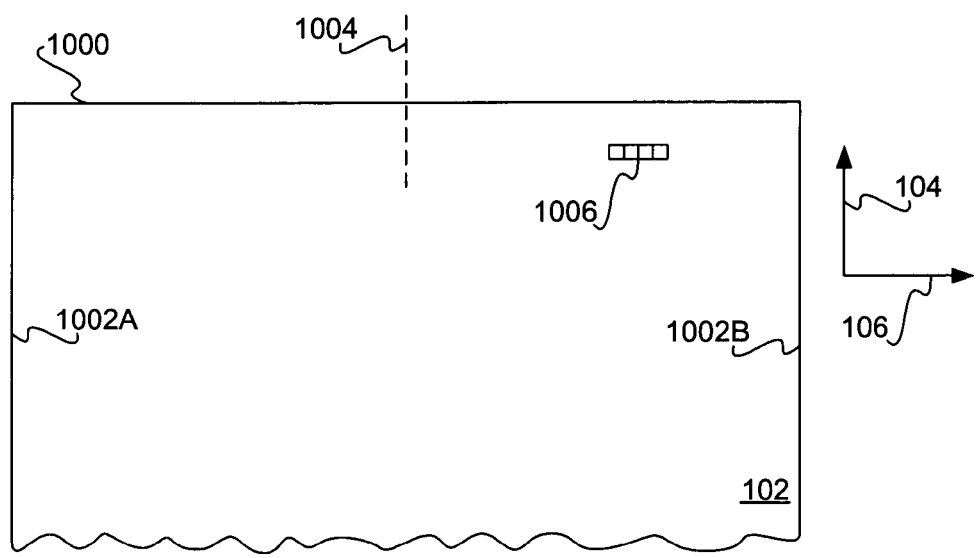
FIG. 10 is a diagram of the top of form, or beginning, of a sheet of media, according to an embodiment of the invention.

FIG. 10 shows the top of form 1000 of the sheet of media 102, according to an embodiment of the invention. The media 102 has a left margin 1002A, a right margin 1002B, a center 1004, and a code 1006 imprinted thereon. The margins 1002 and the center 1004 are with respect to the axis 106, whereas the media 102 advances along the axis 104, as has been described. When the top of form 1000 passes under the media-positioning sensor, the media-positioning sensor may move to the center 1004, so that the top of form 1000, or the top margin, of the media 102 can be detected at the center 1004 of the media 102. This means that regardless of the width of the media 102, which is the distance between the margins 1002A and 1002B, the sensor, because it is movable, is able to detect the top of the form 1000 at the center 1004 of the media 102, which may be desired in at least some situations.

Furthermore, the media-positioning sensor may also move back and forth over the media 102 along the axis 106, so that the precise locations of the margins 1002 are determined. For instance, the width of the media 102 may be initially specified by a user, so that the sensor is able to move to the approximate center 1004 of the media 102 based on these specifications. Thereafter, the precise locations of the margins 1002 can be determined by moving the media-positioning sensor to first locate one of the margins 1002A and 1002B, and to then locate the other of the margins 1002A and 1002B. Precisely location the margins 1002 may be desired where full-bleed printing is performed, as well as in other situations. The media-positioning sensor can also replace a fixed line sensor, providing for cost advantages.

Finally, the media-positioning sensor may be employed to detect, or read, the code 1006 imprinted on the media 102. The presence of the code 1006 may itself signify attributes of the media 102, such as its type and so on. Alternatively, attributes of the media 102 may be encoded within the code 1006, such that the sensor reads the code 1006, and the controller decodes the code 1006 based thereon. In one embodiment, the code 1006 is located at a predetermined location on the media 102 along the axis 104 and/or 106, such that the sensor moves to this predetermined location to determine whether the code 1006 is present, and/or to read the code 1006. In another embodiment, the code 1006 is not located at a predetermined location on the media 102, such that the sensor may scan back and forth along the axis 106 to determine whether the code 1006 is present, and/or to read the code 1006.

Figure 11:
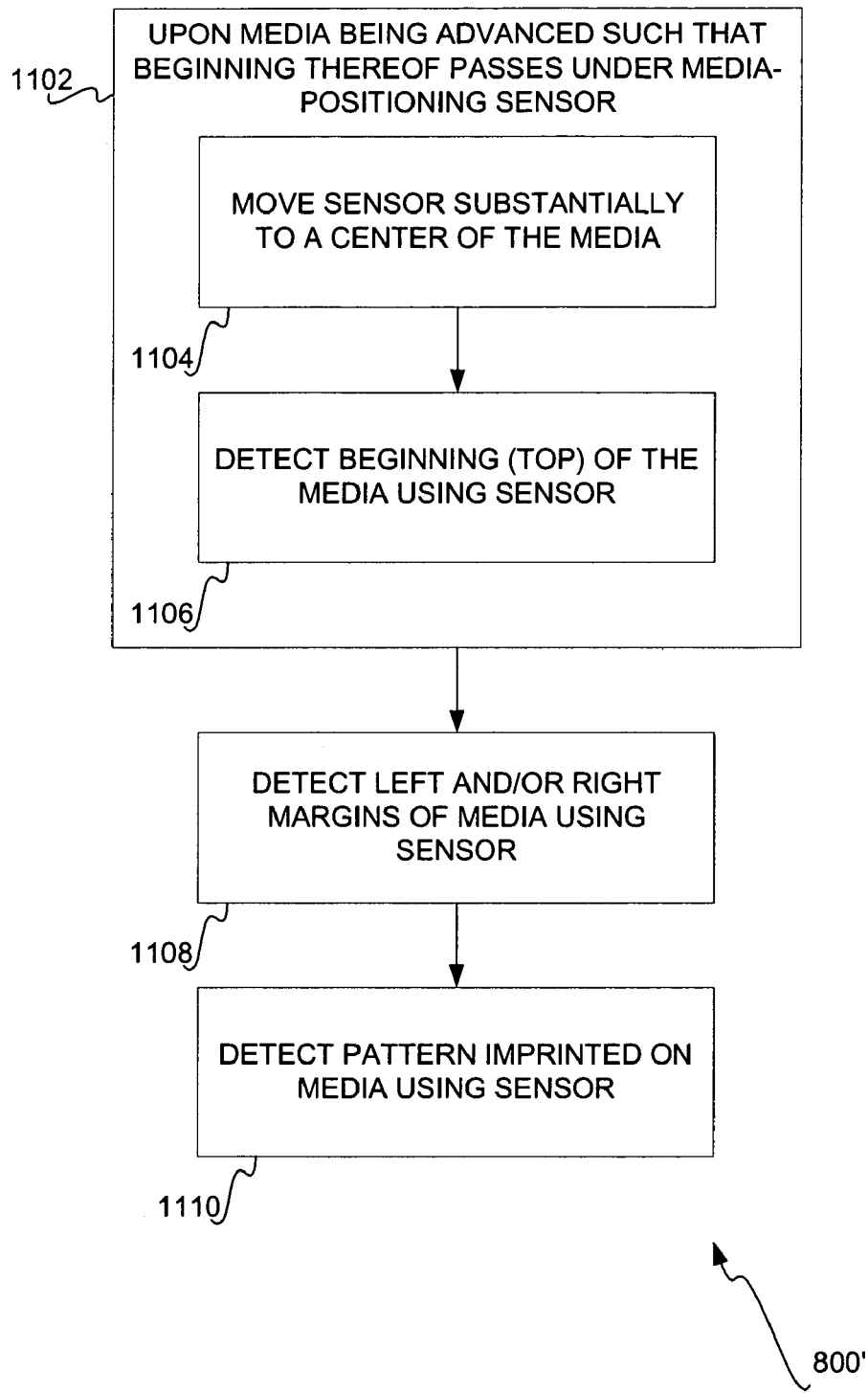
FIG. 11 is a flowchart of a method that can be performed in conjunction with the method of FIG. 8, according to an embodiment of the invention.

FIG. 11 shows a method 800' that can be performed in conjunction with the method 800 of FIG. 8, according to an embodiment of the invention. Upon the media 102 being advanced such that the top of form 1000 thereof passes under the media-positioning sensor (1002), the sensor is moved substantially to the center 1004 of the media 102 (1104). The top of form 1000, or beginning, of the media 102 is then able to be detected using the sensor (1106). Furthermore, the left and/or the right margins 1002 may be detected using the sensor (1108), as well as the pattern 1006 imprinted on the media 102 (1110).

Conclusion

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A media-positioning sensor assembly comprising:
a mechanism to move back and forth over media along a first axis, the media advancing past the mechanism along a second axis perpendicular to the first axis; and,
a media-positioning sensor situated on the mechanism to detect positioning of the media relative to the mechanism along at least one the first axis and the second axis,
wherein one or more of the following is true:
first, the mechanism moves back and forth over the media along the first axis between a first end position and a second end position, the media-positioning sensor having a first sub-sensor remaining over the media when the mechanism is at the first end position and a second sub-sensor remaining over the media when the mechanism is at the second end position; and,
second, upon a beginning of the media passing under the mechanism relative to the second axis, the mechanism moves substantially to a center of the media with respect to the first axis, such that the media-positioning sensor is able to detect the beginning of the media relative to the second axis at the center of the media with respect to the first axis.

2. The media-positioning sensor assembly of claim 1, further comprising a shaft on which the mechanism is slidably attached, such that the mechanism moves back and forth on the shaft and over the media along the first axis.

3. The media-positioning sensor assembly of claim 1, wherein the mechanism comprises a fluid-ejection mechanism having situated thereon a plurality of fluid-ejection devices, such that the media-positioning sensor is situated on the mechanism relative to the plurality of fluid-ejection devices.

4. The media-positioning sensor assembly of claim 3, wherein the fluid-ejection mechanism is an inkjet-printing mechanism, and the plurality of fluid-ejection devices is a plurality of inkjet pens.

5. The media-positioning sensor assembly of claim 1, wherein the mechanism moves back and forth over the media along the first axis between a first end position and a second end position, the media-positioning sensor remaining over the media when the mechanism is at the first end position and when the mechanism is at the second end position.

6. The media-positioning sensor assembly of claim 1, wherein the media-positioning sensor is an optical sensor.

7. The media-positioning sensor assembly of claim 1, wherein the media-positioning sensor is to generate electrical signals at a resolution upon detecting motion of the media relative to the mechanism along at least one of the first axis and the second axis.

8. The media-positioning sensor assembly of claim 1, wherein the media-positioning sensor is to generate firing signals at a resolution upon detecting motion of the media relative to the mechanism along at least one of the first axis and the second axis.

9. The media-positioning sensor assembly of claim 1, wherein the media-positioning sensor comprises:
an optical sensing mechanism to capture images of the media;
an illumination mechanism to illuminate the media as the at least one optical sensing mechanism captures images of the media; and,
a controlling mechanism to control the at least one optical sensing mechanism and the illumination mechanism.

10. The media-positioning sensor assembly of claim 1, wherein the media-positioning sensor captures images of inherent physical aspects of the media, the images utilized to determine positioning of the media relative to the mechanism.

11. The media-positioning sensor assembly of claim 1, wherein upon a beginning of the media passing under the mechanism relative to the second axis, the mechanism moves back and forth over the media along the first axis, such that the media-positioning sensor is able to detect margins of the media with respect to the first axis.

12. The media-positioning sensor assembly of claim 1, wherein upon a beginning of the media passing under the mechanism relative to the second axis, the mechanism moves to a predetermined location over the media along the first axis for the media-positioning sensor to detect a pattern imprinted on the media at the predetermined location.

13. The media-positioning sensor assembly of claim 1, wherein upon a beginning of the media passing under the mechanism relative to the second axis, the mechanism moves back and forth over the media along the first axis for the media-positioning sensor to detect a pattern imprinted on the media.

14. An image-forming device comprising:
a fluid-ejection mechanism to move back and forth over media along a first axis and eject fluid on the media;
a media-advance mechanism to advance the media along a second axis perpendicular to the first axis; and,
a media-positioning sensor moving in concert with the fluid-ejection mechanism to detect positioning of the media relative to the fluid-ejection mechanism along at least one of the first axis and the second axis,
wherein one or more of the following is true:
first, upon a beginning of the media passing under the media-advance mechanism relative to the second axis, the media-advance mechanism moves substantially to a center of the media with respect to the first axis, such that the media-positioning sensor is able to detect the beginning of the media relative to the second axis at the center of the media with respect to the first axis; and,
second, the media-positioning sensor is situated on the fluid-ejection mechanism, and the fluid-ejection mechanism comprises a plurality of fluid-ejection devices including a first fluid-ejection device and a last fluid-ejection device, the media-positioning sensor comprises a first sub-sensor and a second sub-sensor, the first sub-sensor positioned between the first fluid-ejection device and a first end of the fluid-ejection mechanism, and the second sub-sensor positioned between the last fluid-ejection device and a second end of the fluid-ejection mechanism.

15. The image-forming device of claim 14, further comprising a controller to control advancement of the media by the media-advance mechanism and movement over the media by the fluid-ejection mechanism based on positioning of the media relative to the fluid-ejection mechanism as detected by the media-positioning sensor.

16. The image-forming device of claim 15, wherein the media-positioning sensor is to transmit signals to the controller at a resolution upon detecting motion of the media relative to the media-advance mechanism along at least one of the first axis and the second axis.

17. The image-forming device of claim 14, wherein upon a beginning of the media passing under the media-advance mechanism relative to the second axis, the media-advance mechanism moves back and forth over the media along the first axis, such that the media-positioning sensor is able to detect margins of the media with respect to the first axis.

18. The image-forming device of claim 14, wherein upon a beginning of the media passing under the media-advance mechanism relative to the second axis, the media-advance mechanism moves along the first axis for the media-positioning sensor to detect a pattern imprinted on the media.

19. The image-forming device of claim 14, wherein the media-positioning sensor is an optical sensor.

20. The image-forming device of claim 14, wherein the media-positioning sensor is situated on the fluid-ejection mechanism.

21. The image-forming device of claim 20, wherein the fluid-ejection mechanism comprises a plurality of fluid-ejection devices including a first fluid-ejection device and a last fluid-ejection device, the media-positioning sensor situated between the first and the last fluid-ejection devices.

22. The image-forming device of claim 14, wherein the fluid-ejection mechanism is an inkjet-printing mechanism, such that the image-forming device is an inkjet printer.

23. A method comprising:
moving a mechanism over media in a first direction;
sensing positioning of the media relative to the mechanism in the first direction using a media-positioning sensor situated on the mechanism as the mechanism moves over the media in the first direction;
advancing the media in a second direction perpendicular to the first direction; and,
sensing positioning of the media relative to the mechanism in the second direction using the media-positioning sensor situated on the mechanism,
wherein one or more of the following is true:
first, the method further comprises, upon the media being advanced in the second direction such that a beginning of the media passes under the mechanism:
moving the mechanism substantially to a center of the media along the first direction; and,
detecting the beginning of the media using the media-positioning sensor;
second, sensing positioning of the media relative to the mechanism in the first direction comprises:
capturing a plurality of images of the media with the media-positioning sensor as the mechanism moves over the media in the first direction; and,
comparing at least two of the plurality of images captured to determine positioning of the media relative to the mechanism in the first direction; and,
third, sensing positioning of the media relative to the mechanism in the second direction comprises:
capturing a first image of the media with the media-positioning sensor before the media is advanced in the second direction;
capturing a second image of the media with the media-positioning sensor after the media is advanced in the second direction; and,
comparing the second image with the first image to determine positioning of the media relative to the mechanism in the second direction.

24. The method of claim 23, further comprising detecting a pattern imprinted on the media using the media-positioning sensor.

25. The method of claim 23, further comprising:
moving the mechanism over the media in a third direction opposite to the first direction; and,
sensing positioning of the media relative to the mechanism in the third direction using the media-positioning sensor situated on the mechanism as the mechanism moves over the media in the first direction.

26. The method of claim 25, further comprising detecting margins of the media along at least one of the first direction and the third direction using the media-positioning sensor.

27. The method of claim 23, further comprising ejecting fluid onto the media by a fluid-ejection mechanism situated on the mechanism as the mechanism moves over the media in the first direction.

28. The method of claim 23, wherein sensing positioning of the media comprises transmitting signals at a resolution upon detecting motion of the media relative to the mechanism.

* * * * *